UNITED STATES PATENT OFFICE.

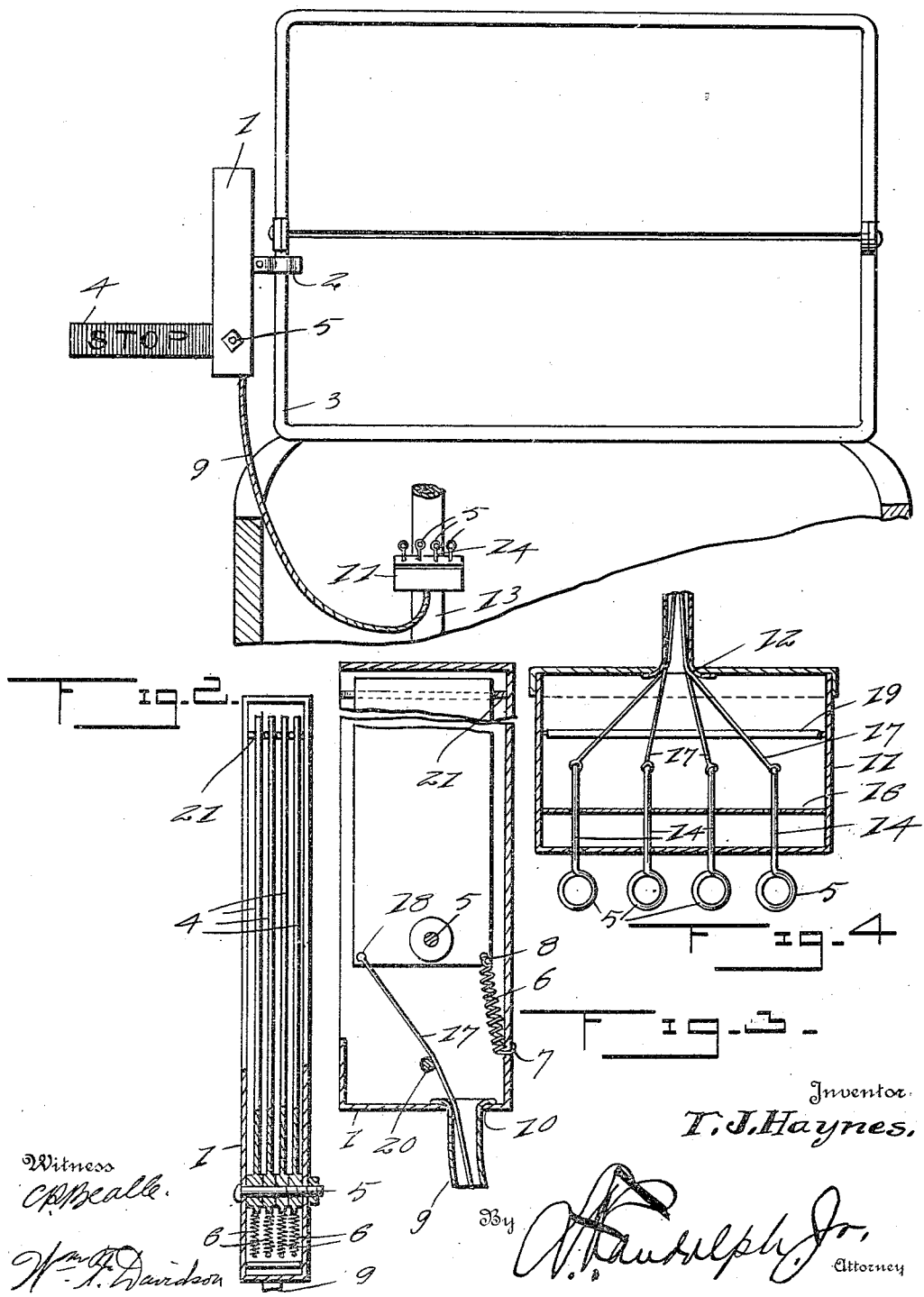

THOMAS J. HAYNES, OF SOUTH BOSTON, MASSACHUSETTS.

DIRECTION-INDICATOR FOR AUTOMOBILES.

1,265,651.   Specification of Letters Patent.   Patented May 7, 1918.

Application filed March 20, 1917. Serial No. 156,062.

*To all whom it may concern:*

Be it known that I, THOMAS J. HAYNES, a citizen of the United States, residing at South Boston, in the county of Suffolk and State of Massachusetts, have invented certain new and useful Improvements in Direction-Indicators for Automobiles; and I do hereby declare the following to be a full, clear, and exact description of the invention, such as will enable others skilled in the art to which it appertains to make and use the same.

This invention relates to a direction indicator for automobiles and has for one of its objects the provision of a device of this character, whereby the operator of the automobile may readily notify traffic in front and rear of the automobile in which direction a turn is to be made and if the automobile is going to proceed slowly or stop.

Another object of this invention is the provision of a casing having pivotally mounted therein a plurality of arms, each bearing direction indicating characters, and are adapted to be swung outwardly of the casing to indicate the procedure of the automobile.

A further object of this invention is the provision of means connected to the arms for normally supporting them within the casing.

A further object of this invention is the provision of means connected to the arms and located adjacent the operator of the automobile, whereby any one of the arms may be swung outwardly of the casing to a signaling position.

A still further object of this invention is the provision of a direction indicator for automobiles of the above stated character, which shall be simple, durable and efficient, and which may be manufactured and sold at a comparatively low cost.

With these and other objects in view, as will become more apparent as the description proceeds, the invention consists of certain novel features of construction, combination and arrangement of parts as will be hereinafter more fully described and claimed.

For a complete understanding of my invention, reference is to be had to the following description and accompanying drawing, in which:

Figure 1 is a fragmentary rear elevation, partly in section of an automobile, illustrating my invention applied thereto, Fig. 2 is a sectional view of the casing illustrating the arms positioned therein, Fig. 3 is an enlarged vertical sectional view of the casing, illustrating the means for normally supporting the arms within the casing, and Fig. 4 is a sectional view of the casing carrying the operating means for the arms.

Referring in detail to the drawing, the numeral 1 indicates an elongated casing which has secured to one of its sides, a suitable clamp 2 that may be secured to the automobile at any desired point, but to more specifically illustrate my invention, I have it shown as applied to the wind shield 3 of the automobile, as clearly shown in Fig. 1.

One of the side walls of the casing 1 is removed for permitting a plurality of signaling arms 4 which are pivoted within the casing, as shown at 5 to swing exteriorly of the casing to horizontal position, as shown in Fig. 1.

Each of the signaling arms 4 have printed or otherwise applied thereon, certain direction indicating characters, such as "Stop, Left, Right, Slow."

Coiled springs 6 are connected to the casing, as at 7 and have their opposite ends connected to the pivoted ends of the arms as shown at 8 for normally supporting said arms within the elongated casing, which is supported vertically upon the wind shield 3.

A flexible tube 9 has one end secured in the bottom wall of the casing 1, as at 10 and its opposite end secured in a receptacle 11, as shown at 12. The receptacle 11 is provided with a suitable clamp for clamping it to the steering post 13 of the automobile. One wall of the receptacle 11 is provided with a plurality of apertures to slidably receive rods 14, which have their outer ends bent to form finger grips 15. Located within the receptacle 11 is a guide 16 for the purpose of receiving and supporting the inner portions of the rods 14. Secured to the inner ends of the rods 14 are wires 17, which extend through the flexible tube 9 and are connected to the signaling arms 4 as at 18, whereby upon pulling upon any one of the finger grips 15, the respective signaling arm connected thereto by the wire 17 is swung to a horizontal position or signaling position without the casing, so that the traffic in front and rear of the automobile may determine in which direction the automobile is going to proceed.

Located within the receptacle 11 is a suitable roller 19, for the purpose of supporting the wires 17 adjacent their point of connection with the rods 14. A similar roller 20 is located within the casing 1 for supporting the wires at a point adjacent their connection with the arms.

A guide plate 21 is located within the upper end of the casing 1 and has a plurality of slots, which are adapted to receive the upper ends of the arms when said arms are automatically swung to a vertical position within the casing. The arms are received within the slots of the guide plate 21, thus preventing any undue movement of said arms, while within the casing.

While I have shown and described the preferred embodiment of my invention, it will be understood that minor changes in construction, combination and arrangement of parts may be made without departing from the spirit and scope of the invention as claimed.

Having thus described my invention, what I claim is:

A direction indicator comprising a receptacle secured to the steering post of an automobile, a removable bottom wall on said receptacle and having an opening, a flexible tube having one end disposed within said opening and flared to retain the same therein, a partition within said receptacle and having apertures, operating rods slidable in the apertures and through the top wall of said receptacle, cables connected to the ends of the operating rods and extending through the flexible tube, a roller journaled in said receptacle and supporting the ends of the cables connected to the operating rods, a casing secured to the automobile and having its side wall open, a semaphore arm pivoted within said casing and connected to the cables whereby upon operating the operating rods the semaphore will be swung exteriorly of the casing, and springs connected to the semaphores and to the casing for returning said semaphores within said casing.

In testimony whereof I affix my signature in presence of two witnesses.

THOMAS J. HAYNES.

Witnesses:
 ARTHUR G. EATON,
 WM. H. MARGESEN.